April 20, 1943.                S. H. MAJOR                2,317,206
                              EDUCATIONAL TOY
                            Filed May 19, 1941              2 Sheets-Sheet 1
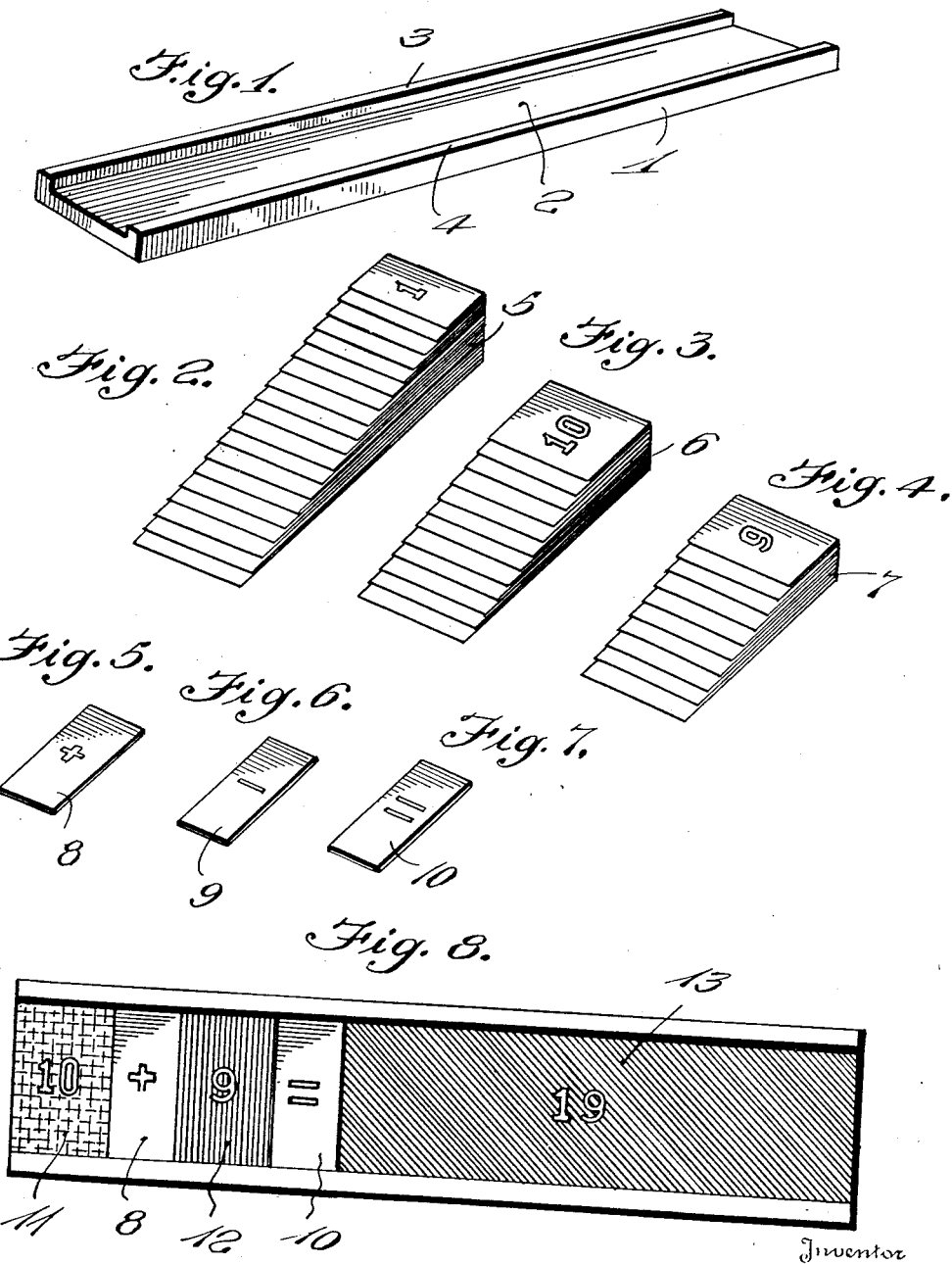
Inventor
SIDNEY H. MAJOR
By Lacey & Lacey
Attorneys April 20, 1943.  S. H. MAJOR  2,317,206
EDUCATIONAL TOY
Filed May 19, 1941.  2 Sheets-Sheet 2
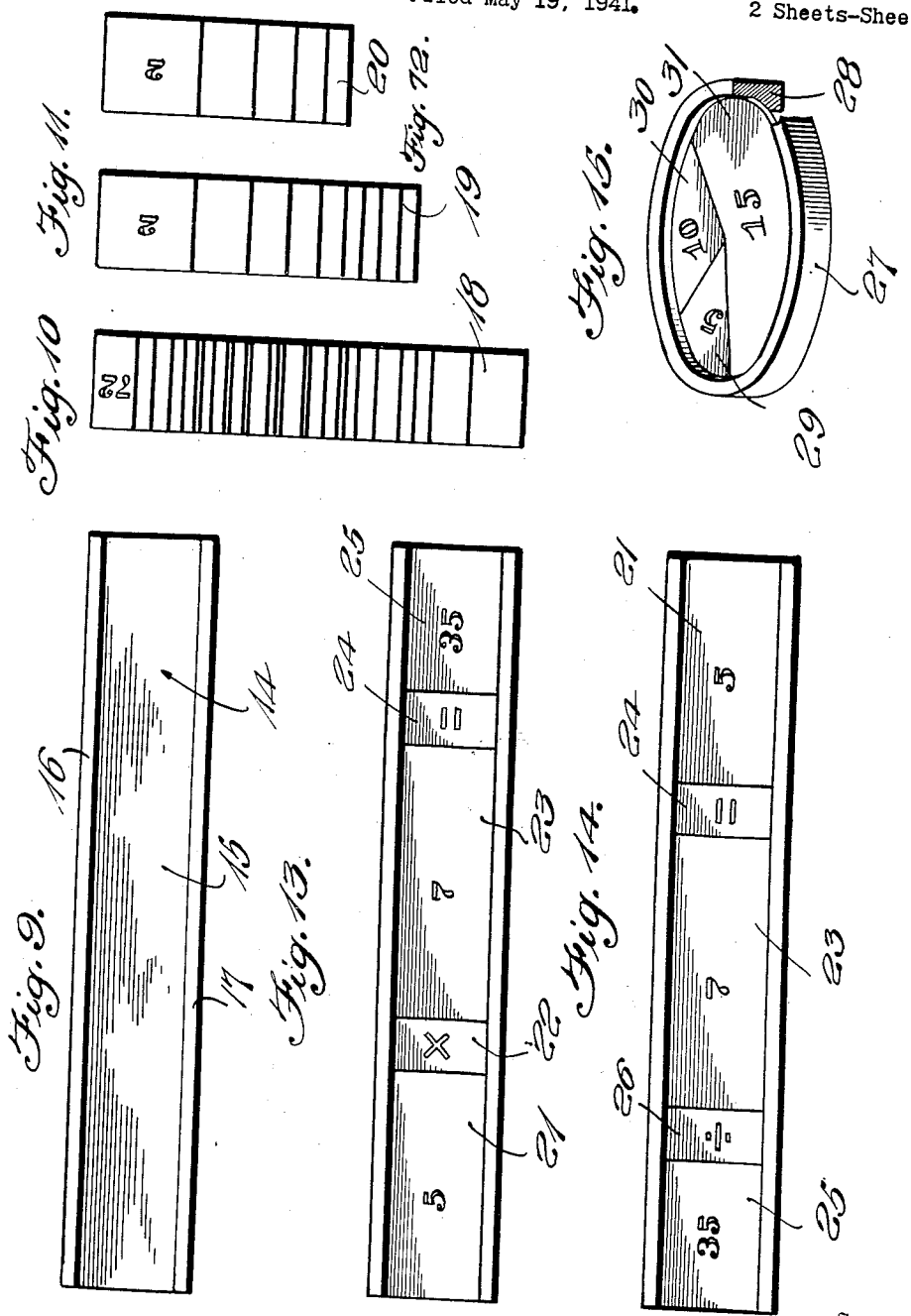
Inventor
SIDNEY H. MAJOR,
By Lacey & Lacey
Attorneys Patented Apr. 20, 1943

2,317,206

UNITED STATES PATENT OFFICE 2,317,206

EDUCATIONAL TOY

Sidney H. Major, Storm Lake, Iowa

Application May 19, 1941, Serial No. 394,195

2 Claims. (Cl. 35—31)

This invention relates generally to toys and more particularly to an improved educational toy for children.

One object of the invention is to provide an educational toy by the use of which it will be possible for a child to solve simple arithmetical problems and to check his solutions of such problems.

Another object of the invention is to provide an appliance of this character employing a plurality of cards of different sizes and a frame or holder for said cards, said cards having a definite size relationship to each other and to the frame or holder.

A further object of the invention is to provide an educational toy wherein the cards employed are of different colors, or are otherwise provided with distinguishing marks, so as to designate particular uses for each of the cards and to add to the attractiveness of the invention.

A still further object of the invention is to provide an educational toy, the cards and holder of which may be made in various shapes and sizes without departing from the principle of operation of the device.

Still another object of the invention is to provide an educational toy wherein cards of different sizes and marked with numerals are used in combination with other cards having numerals, with cards having symbols and with a holder for solving problems in addition, subtraction, multiplication or division, said cards having numerals therein having definite size relationship with each other, with the cards having symbols thereon and with the holder.

And a further object of the invention is to provide a toy of this character which will be simple in construction and which may be manufactured in quantity to retail at low cost.

Further objects of the invention, not mentioned hereinbefore, will become apparent during the course of the following description.

In the drawings forming a part of my application:

Figure 1 is a perspective view of the holder employed with my improved game,

Figures 2, 3 and 4 are perspective views of stacks of the cards employed in conjunction with the holder, said cards having numerals thereon, Figures 5, 6 and 7 are perspective views of cards having symbols thereon, Figure 8 is a top plan view of my educational toy as it would appear with proper numeral and symbol cards in position on the holder for solving and checking a simple problem in addition, Figure 9 is a top plan view of the holder employed in conjunction with the device when the same is used for solving problems in multiplication and division, Figures 10, 11 and 12 are top plan views of stacks of cards to be used in conjunction with the holder shown in Figure 9, Figure 13 is a top plan view of my educational toy as it would appear with proper numeral and symbol cards in position on the holder for solving and checking a simple problem in multiplication, Figure 14 is a top plan view of the invention with proper numeral and symbol cards in position for solving and checking a simple problem in division, and Figure 15 is a perspective view, partly in section, showing a modified embodiment of the invention.

Referring now to the drawings and more particularly to Figures 1 through 8 thereof, the numeral 1 indicates in general the holder of my invention. Said holder is formed of wood, plastic, or other suitable material and, as shown, is substantially trough-shaped in contour. The holder 1 is open at its opposite corresponding ends and includes a flat unobstructed bottom surface 2 and side flanges 3 and 4. It should be understood that the holder 1 may be formed in other shapes not shown in Figure 1 if desired.

In Figures 2, 3 and 4 of the drawings, I have shown stacks of cards 5, 6 and 7. Each of the cards of each stack of cards is numbered. The cards of the stack shown in Figure 2 are numbered beginning with the numeral "1," each card being of slightly greater size than its immediately preceding card. The cards of the stack of cards shown in Figure 3 are numbered beginning with the numeral "10" and the cards of the stack of cards shown in Figure 4 are numbered similarly beginning with the numeral "9."

In Figure 5 of the drawings, I have shown, at 8, a card of relatively short length on which is placed the "plus" sign. In Figure 6 of the drawings, a card 9 is shown and this card has thereon the "minus" sign. I have shown, at 10, in Figure 7 a card on which is placed the "equals" sign.

Referring to Figure 8 of the drawings, it will be seen that I have shown a concrete example of a simple problem in addition and the solution thereof, as carried out in accordance with my invention. In practice, a child places a card 11, bearing the numeral 10 thereon, at one end of the holder, the outer edge of said card being in vertical alinement with the end edge of the left end of said holder. A child then places the card 8 in the holder adjacent the card 11. After this is done a card 12, bearing the numeral 9 thereon, is placed in the holder adjacent the card 8. A card 10, bearing "=" thereon, is placed in the holder adjacent the card 12. At this point the child will have assembled the cards to present a problem in simple addition. That is to say, "10+9=." In order to ascertain the correct answer to this problem, the child searches for a card which will be of a length sufficient to cover the entire remaining exposed surface of the wall 2 of the holder. This card is shown at 13 and, of course, bears the numeral 19 thereon. It will be observed that, as stated, this card extends throughout the entire remaining length of the holder but does not overlap the right end of said holder. The child is taught that, by virtue of the fact that the card 13 just covers the remaining exposed surface of the wall 2 of the holder, the right card has been found, as said card bears the numeral 19 thereon, which is the correct answer to the simple problem in addition. The child knows that 19 is the sum of 10 and 9. If the wrong card were chosen by the child, said card would either fail to cover the remaining exposed surface of the wall 2 or would extend beyond the open right end of said holder, the numeral appearing on each such incorrect card would, of course, give an incorrect answer. It will thus be seen that the child can always check the correctness of his answer.

It will be readily understood from the foregoing that, should a child desire to solve the problem of subtraction, the card 9 is substituted for the card 8 and appropriate cards are employed to present the problem and to solve it. As in the case of the problem of addition, the card bearing the correct answer will cover the exposed surface of the wall 2 of the holder and any card bearing the incorrect answer will either fail to cover said exposed surface or will overlap the right end of the holder.

It is desired particularly to point out that the cards bearing the numerals thereon have a definite size relationship to each other, to the cards bearing the symbols thereon, and to the holder.

In Figures 9 through 14 of the drawings, I have disclosed an embodiment of the invention which is substantially identical with that shown in Figures 1 through 8 of said drawings. However, the holder employed in the embodiment of the invention now to be described is of somewhat greater length than the holder 1. The holder of this embodiment of the invention is illustrated in Figure 9 and is shown at 14. Said holder is of a shape identical with that of the holder 1 and includes a bottom wall 15 and side flanges 16 and 17. The holder 14, like the holder 1, is open at its corresponding opposite ends and is formed of wood, plastic, or other suitable material. In Figures 10, 11 and 12 of the drawings are shown stacks of number cards which are indicated, respectively, at 18, 19 and 20. This embodiment of the invention lends itself particularly well for use in solving problems of multiplication and division. For that reason the numbers appearing on the number cards of the stack of cards 18 are relatively high. In Figure 13 I have shown the invention as it would appear with certain of the cards arranged to define a simple problem in multiplication. That is to say, a card 21, bearing the numeral 5 thereon, is first placed in the holder 14. The outer end edge of the card 5 is disposed in vertical alinement with the left end edge of the holder 14. After this is done, a symbol card 22 is placed in the holder adjacent card 21, said symbol card having indicia thereon representing "times." A card 23 is then placed in the holder with one edge thereof adjacent the card 22. A symbol card 24, having indicia thereon representing "=" is placed in the holder adjacent the card 23. The cards 21 through 24, as will be seen, arranged in the manner shown, present the problem of 5×7=. In order to solve the problem, the child selects a card which will just cover the remaining exposed surface of the wall 15 of the holder. This card is shown at 25 and has the numeral 35 thereon which is, of course, the correct answer to the problem.

In Figure 14 of the drawings, cards have been arranged to present a problem in division and, of course, the solution of said problem. In this view, it is assumed that it is desired to divide the numeral 35 by the numeral 7. The card 25, bearing the numeral 35 thereon, is first placed in the holder with its outer edge in vertical alinement with the left end edge of the holder. A symbol card 26, having the symbol of division thereon, is placed in the holder adjacent the card 25. Then the card 23 is placed in the holder adjacent the card 26. After this is done, the card 24 is placed in the holder. The card 21 bearing the numeral 5 thereon just covers the remaining exposed surface of the wall 15 of the holder 14 and is, of course, the proper card to give the right answer to the problem.

The lengths of the cards employed for carrying out multiplication and division are based upon the table of logarithms and anti-logariths, as used in the Mannheim slide rule.

As pointed out hereinbefore, the cards used are distinctively marked, this being preferably accomplished by using cards of different colors, although they may have other distinguishing marks on them. The purpose for having distinguishing colors or other features on the cards is to distinguish said cards according to their respective purposes. In other words, cards 11 and 12 to be added, one may be yellow and the other red, and the card 13 green. Therefore, the child uses a yellow card and a red card when selecting cards to be added and knows that a green card of the proper length must be used for the answer. When a green card of the exact length is found, it will bear the correct answer. In like manner, subtraction may be solved by first placing a green card bearing the larger of the two numbers of the problem at the left of the holder, then placing a red card bearing the number to be subtracted in the holder with a minus card between the two cards and an equals card after them, and when a yellow card of the proper length is found, it will bear the correct answer to the problem. The fact that the card bearing the correct answer is of a color different from the cards of the problem, eliminates possibility of the wrong card being used for the answer.

As stated, by coloring or otherwise providing the different cards with distinguishing marks, the attractiveness of the invention is enhanced.

In Figure 15 of the drawings, I have shown a modified embodiment of the invention. In this embodiment of the invention, I employ a holder 27 which is of circular or ring shape and which, as best shown in section, includes a shoulder 28. Mounted in the ring shaped holder 27 are sector shaped cards 29, 30 and 31 which combine to present a problem in arithmetic and the solution thereof. This embodiment of the invention differs from the embodiments previously described in that the holder is circular and that the cards are of sector shape. The principle or use of the invention is entirely the same and, as it would appear obvious, the holder 27 may be made of hexagonal or other similar shape without departing from the scope of the invention. It is also, of course, obvious that the cards will necessarily be shaped to conform to the interior contour of the holder irrespective of what that may be.

Having thus described the invention, what is claimed as new is:

1. An educational toy comprising an elongated holder open at its ends and having a flat wall extending throughout its length, a plurality of sets of cards of predetermined different lengths, the cards of each set being readily distinguishable from cards of the other sets, selected cards of certain of said sets being removably fitted into said holder from one end thereof in edge to edge engagement with each other and covering the surface of said wall for a predetermined distance from the said end of the holder, said cards bearing indicia cooperating to form an arithmetical problem to be solved, and a single card from another set removably fitted into the holder and being of a length adapting it to exactly cover the remaining uncovered portion of the surface of the wall and bearing indicia representing the answer to the problem, the last mentioned card having its outer end edge terminating in registry with the adjacent end edge of the holder, and the outermost one of the first mentioned cards having its outer end edge in registry with the adjacent end edge of the holder.

2. An educational toy comprising a holder open at its ends and formed with upper and lower marginal flanges, a plurality of cards having numerals thereon removably resting on one end portion of the holder between the flanges, said cards being readily distinguishable from each other, cards removably resting on the holder between the flanges with their end edges in engagement with opposite end edges of the first mentioned cards and having symbols thereon, the numerals and the symbols on said cards representing an arithmetical problem to be solved, and a single card carried by the holder, the last mentioned card being readily distinguishable from the other cards and of a length to exactly cover the remaining uncovered surface of the holder and having indicia thereon representing the answer to the problem.

SIDNEY H. MAJOR.